(12) United States Patent
Lee

(10) Patent No.: US 11,163,544 B2
(45) Date of Patent: Nov. 2, 2021

(54) VERTICAL SOLUTION INTEGRATOR

(71) Applicant: David Lee, Atherton, CA (US)

(72) Inventor: David Lee, Atherton, CA (US)

( * ) Notice: Subject to any disclaimer, the term of this patent is extended or adjusted under 35 U.S.C. 154(b) by 0 days.

(21) Appl. No.: 17/210,363

(22) Filed: Mar. 23, 2021

(65) Prior Publication Data

US 2021/0294585 A1  Sep. 23, 2021

Related U.S. Application Data

(60) Provisional application No. 62/993,497, filed on Mar. 23, 2020.

(51) Int. Cl.
| | |
|---|---|
| *G06N 7/00* | (2006.01) |
| *G06F 8/41* | (2018.01) |
| *G06N 20/00* | (2019.01) |
| *G06F 8/33* | (2018.01) |
| *G06F 8/10* | (2018.01) |

(52) U.S. Cl.
CPC .............. *G06F 8/433* (2013.01); *G06F 8/10* (2013.01); *G06F 8/33* (2013.01); *G06N 20/00* (2019.01)

(58) Field of Classification Search
CPC ................................. G06N 20/00; G06F 8/20
USPC .......................................................... 706/59
See application file for complete search history.

(56) References Cited

U.S. PATENT DOCUMENTS

| | | | | |
|---|---|---|---|---|
| 10,042,636 | B1* | 8/2018 | Srivastava | G06Q 10/06 |
| 10,671,443 | B1* | 6/2020 | Ramachandran | G06F 9/546 |
| 10,855,625 | B1* | 12/2020 | Viswanathan | H04L 51/18 |
| 10,979,318 | B2* | 4/2021 | Meyer | H04L 41/5051 |
| 11,025,511 | B2* | 6/2021 | Asthana | H04L 41/5048 |
| 2016/0277312 | A1* | 9/2016 | Ferris | H04L 41/0869 |
| 2016/0378450 | A1* | 12/2016 | Fu | G06F 8/60 |
| | | | | 717/177 |
| 2018/0307945 | A1* | 10/2018 | Haigh | G06N 20/00 |
| 2018/0329968 | A1* | 11/2018 | Damaggio | H04L 67/34 |
| 2018/0332117 | A1* | 11/2018 | Street | G06F 9/542 |
| 2018/0336019 | A1* | 11/2018 | Schmidt | G06F 16/252 |

(Continued)

FOREIGN PATENT DOCUMENTS

WO   WO-2018208407 A1 * 11/2018 ............... G06F 8/60

OTHER PUBLICATIONS

Jun-Ho Huh et al. "Understanding Edge Computing: Engineering Evolution With Artificial Intelligence"; IEEE Access (vol. 7); Oct. 7, 2019.*

(Continued)

*Primary Examiner* — Francisco J Aponte
(74) *Attorney, Agent, or Firm* — David T. Millers

(57) ABSTRACT

A Vertical Solution Integrator (VSI) enable users to build an application vertical solution system on an AI platform without any coding efforts. The VSI may include a model orchestration system, a model adaptation system, a control module, and analytics engines. The orchestration system interfaces with a user to create a workflow that is based on user requirements and is represented by a Directed Acyclic Graph that includes interacting artificial intelligence, machine learning, computing, or logic models. A GUI enables construction the workflow without need of user coding efforts. The model adaptation subsystem coverts the models into adapted modes that are compatible and interoperable, and the control module assigns analytics engines to execute the adapted models.

12 Claims, 5 Drawing Sheets

(56) References Cited

U.S. PATENT DOCUMENTS

| | | | | |
|---|---|---|---|---|
| 2020/0136906 A1* | 4/2020 | Bernat | ............... | H04L 41/5054 |
| 2020/0145337 A1* | 5/2020 | Keating | ............... | G06F 9/5077 |
| 2020/0167196 A1* | 5/2020 | Smith | ................ | G06F 9/542 |
| 2020/0327371 A1* | 10/2020 | Sharma | ................ | G06N 5/04 |
| 2021/0014113 A1* | 1/2021 | Bernat | ............... | H04L 41/0806 |
| 2021/0042638 A1* | 2/2021 | Novotny | ............. | G06F 11/3438 |
| 2021/0112128 A1* | 4/2021 | Joshi | ................. | G06F 9/45558 |
| 2021/0157551 A1* | 5/2021 | Bliss | ................. | G06F 8/10 |
| 2021/0208943 A1* | 7/2021 | Baughman | ............... | G06F 8/60 |

OTHER PUBLICATIONS

Anirban Bhattacharjee et al. "STRATUM: A BigData-as-a-Service for Lifecycle Management of IoT Analytics Applications"; 2019 IEEE International Conference on Big Data (Big Data).*

D. Lee and M. Yannakakis, Principles and Methods of Testing Finite State Machines-a Survey, Proceedings of the IEEE, vol. 84, Issue: 8, Aug. 1996.

Cisco Systems, Inc., "Cisco Video Analytics, Data Sheet," Cisco Public Information, Aug. 2015.

* cited by examiner

VERTICAL SOLUTION INTEGRATOR

CROSS-REFERENCE TO RELATED APPLICATIONS

This patent document claims benefit of the earlier filing date of U.S. Provisional Pat. App. No. 62/993,497, filed Mar. 23, 2020, which is hereby incorporated by reference in its entirety.

BACKGROUND

The Internet Technology (IT) industry has widely adopted Cloud and Edge computing for extending IT services, particularly Artificial Intelligence (AI). Cloud computing generally refers to the on-demand availability of computer resources, especially data storage (cloud storage) and computing power, that do not require direct or active user management of computer resources or hardware. Edge computing refers systems and methods that attempt improve response times and save processing and communication bandwidth using distributed computing that brings computation and data storage closer where the services are needed. Newer computer services, Artificial Intelligence (AI), for instance, as provided by Google App Engine, MS Azure and numerous startups have particularly adopt edge and cloud computing paradigms. A focus of current AI platform services and technology advancement is on extending AI models and improving the performance of AI models.

AI application system development remains a major challenge for many users that may need solutions utilizing several different AI services. Design and develop of an application system for a specific user's requirements may require a team of AI experts and software and system engineers. This development is rather costly and time consuming yet with uncertain quality and service performances. These major hurdles need to be overcome for AI to become a leading technology that truly impacts daily life.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Current AI platforms are in a similar state to that of the computer systems before the invention of Operating System (OS). An operating system, e.g., Microsoft Windows, macOS, Android's, iOS, Unix and Linux, generally provides a software system that manages computer hardware and software resources and provides services for computer programs. An OS generally makes the different parts on a computer system platform work together through the kernel that interfaces with the user applications, CPU, memory, and devices. Intelligent operating systems with the versatile high-level programming languages such as c/C++, Java, and Python have empowered computer systems, revolutionized the computing industry and enabled the construction of complex application systems that are much easier to program and much less costly and have short design to delivery cycles with desirable reliability and performance.

AI platforms currently need an enabling technology, similar to the OS and high-level programming languages for the computer systems, to allow AI platforms to gain popularity and meet the demands of real applications. In accordance with an example of the present disclosure, a Vertical Solution Integrator (VSI) provides a framework for combining one or more AI functions to interoperate with each other and with I/O hardware and data stores in an application or solution that serves real world user requirements. (The term "user" is used broadly herein and, depending on context, includes a system administrator, a data analyst, other personnel that creates or maintains a system, or the individual(s) or enterprise that owns or uses the system.) A VSI may enable users to construct application systems on an AI platform without any manual programming, which makes the AI platform a no-code system development platform. A VSI simplifies the process of creating systems that employ AI functions and thereby avoids the need for dedicated expert teams or system integrators.

A VSI may particularly employ a graphical user interface through which a user can select the needed AI functions and other system models and objects for an AI analytics engine, and create a workflow of a custom vertical solution system. The AI analytics engine can execute the workflow from interpreting a workflow description file. Or, the workflow description file can be compiled for generating Python or c/C++ code that the analytics engine can execute. The results from the analytics engine may be stored or output to the user. The VSI may be further empowered with formal analysis capabilities for automatically analyzing the created vertical solution systems. The formal analysis capabilities may, for example, include formal verification, validation and testing procedures for correctness, robustness, and performance of a solution. The VSI can support a no-code AI system development platform throughout the whole process, so that there is no need of manual coding.

Figure 1:
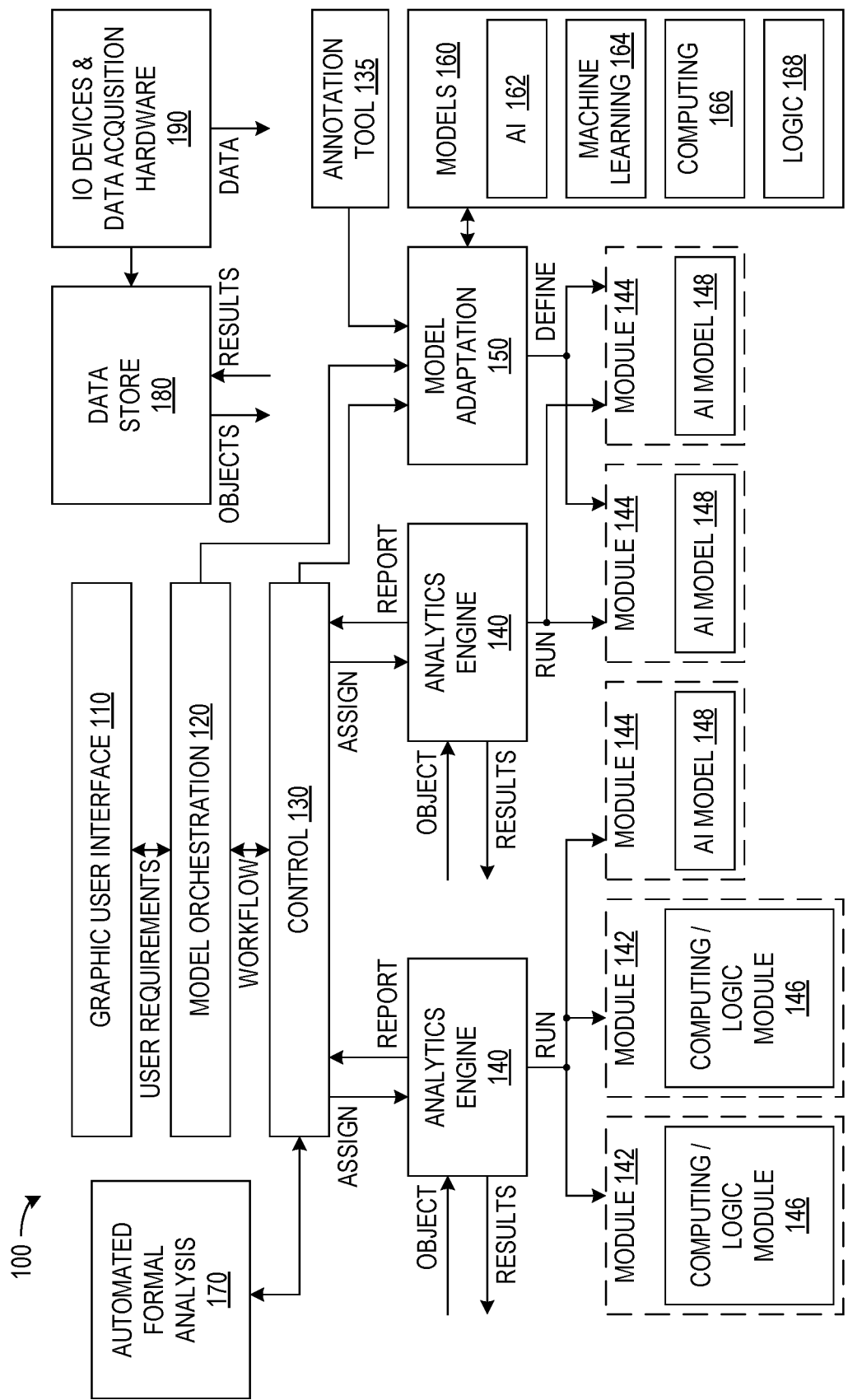
FIG. 1 is a block diagram illustrating an architecture of a vertical solution integrator system in accordance with an example of the present disclosure.

FIG. 1 is a block diagram illustrating an architecture of a VSI system 100 in accordance with an example of the present disclosure. VSI system 100 may operate on a platform that that provides a graphical user interface 110, a model orchestration module 120, a control module 130, and analytics engines 140. Broadly, user interface 110 enables a user to interact with model orchestration module 120 and express or formulate requirements that the user has for an analysis solution. With user input, model orchestration module 120 identifies or constructs a workflow, e.g., a workflow description file, for a solution that fulfills the user's requirements and passes workflow information to control module 130. An automated formal analysis module 170 may check and validate the workflow. Control module 130 then assigns one or more analytics engines 140 to execute models identified in the workflow information. Models 160 include building blocks or components that control module 130 needs for the workflow solution meeting the user requirements. A model adaptation module 150 may adapt the required models from models 160 to create adapted models 146 and 148 for use by modules 142 and 144 of analytics engine 140. Analytic engines 140 when set up by control module 130 and model adaptation module 150 receives objects including data, e.g., from a data store 180 or I/O devices and data acquisition hardware 190, and may return results to data store 180 or through user interface 110 to the user.

Models 160, as mentioned above, include models that a workflow may employ in an integrated vertical solution. In the example of FIG. 1, models 160 includes models for AI analytics 162, Machine Learning (ML) 164, computing 166, and logic 168. AI analytic models 162 may include, for example, models for Facial Recognition, Moving Object Tracking, Speech-to-Text Translator or other AI analysis. Machine Learning models 164 in models 160 may include deep neural network processes and AI model training processes with the pertinent application data and environment for optimizing their performance, e.g., an Annotation Tool to record trained parameters that optimize performance. Computing models 166 may be used for mathematical computation, and logic models 168 for enforcing an execution logic sequence and temporal properties. An AI model 162 may be a modular package of analytics functions, e.g., Facial Recognition, Moving Object Tracking and Speech-to-Text Translation. After an appropriate model training using application data, the AI model performs the analytics with EA for the machine learning, deep neural network, and other computations.

Analytics engines 140 are capable of executing AI models and other programs or subroutines, to analyze objects and/or access an external service platform, e.g., a cloud AI service, that analyzes object that analytics engine 140 provides or needs. For example, an object may include or provide data such as a video data stream from data store 180 or I/O devices or data acquisition hardware 190, e.g., a video camera, and an analytics engine 140 may be set up with a facial recognition model that the analytics engine 140 executes to analyze of the video data stream or may be set up to format and provide the video data stream to an external facial recognition service platform.

Model Selection and Training

Users have a wide range of objects for AI analytics. For example, a user may have hardware that generates video, audio, image, speech, and text, and an object may be in the form of a real-time data stream or stored data. Users also have a wide range or needs or requirements for AI analytics. For instance, a user may need facial recognition from a real-time video camera data stream and image analysis or comparison to stored image files to distinguish or identify individuals in the video stream. For different analytics objects and user requirements, a data analyst may select the needed AI and ML models, e.g., facial recognition, moving object tracking, and speech-to-text translation. AI models may be associated with machine learning and/or deep neural network analytics that are needed for use or optimization of the AI models in specific applications. For instance, some specific models include Bidirectional Encoder Representations from Transformers (BERT) for natural language processing (NLP) pre-training, DeepVoice for Text-to-Speech Translation, Yolov5 for object recognition, FaceNet for Facial Recognition, DeepSort for Object Tracking and OpenPose for Gesture Recognition. Such models can be selected from local AI Platforms, Libraries and Open Source. Models can also be obtained via an interface from other AI Platforms, e.g., Microsoft Azure® and Google® Platform. Whenever necessary, these models are first trained with the user data in the application environment to tune the model parameters for improving the accuracy and optimizing the performance.

Model Adaptation

VSI system 100 to create a vertical solution generally selects and trains AI and ML models to be integrated into a workflow that performs the needed AI analytics task, e.g., Video Analytics, Audio Analytics, Image Analysis, Speech Recognition, and Speech-to-Text Translation. However, the AI Models, which may be from different sources and may be used for different purposes, may have quite different formats, I/O requirements, attributes and execution restrictions and hence may not interoperate unless adapted to work together. As is evident from the currently prevalent AI models, e.g., BERT for Natural Language Processing (NLP), Google Speech-to-Text Translation, Yolov5 for Object Recognition, FaceNet for Facial Recognition, DeepSort for Object Tracking, and OpenPose for Gesture Recognition, AI models can be provided as open source or by different AI service providers with quite different hardware, software and Cloud provision environments.

Figure 2:
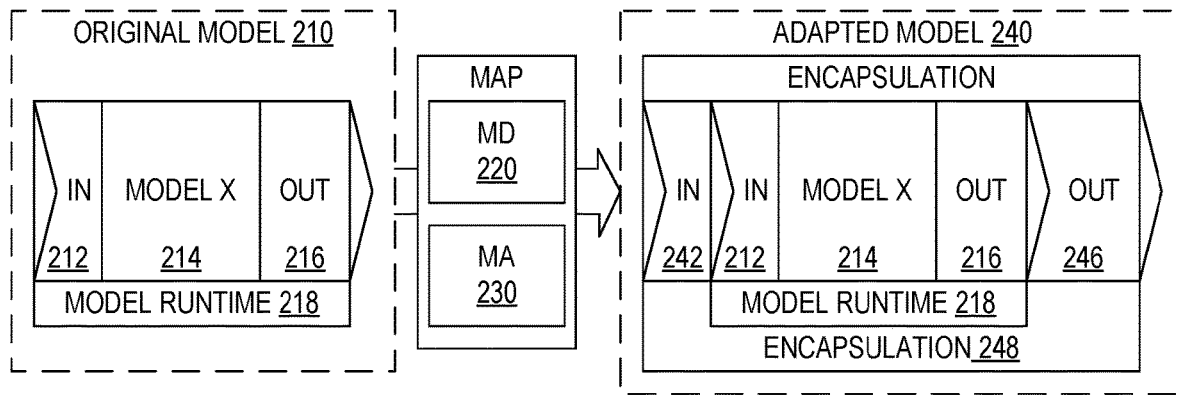
FIG. 2 is a block diagram illustrating adaption of an original model to produce an adapted model in accordance with an example of the present disclosure.

Model adaption module 150 employs a model adaptation process to unify models for interconnectivity and interoperability. FIG. 2 illustrates adaptation of an original model 210 to produces an adapted model 240. In general, original model 210 requires specific input 212, e.g., specific types of input data having specific formats, that model 214 is able to process to produce specific output, e.g., specific types of output data having specific formats. Original model 210 may have specific runtime limitations or requirements, e.g., an expected runtime for model 214 to process a specific quantity of input data and produce output data. Model adaption module 150 processes each original model 210 through a Model Adaptor (MA) 230 that uses a Model Descriptor (MD) 220 and produces adapted model 240. In general, adapted model 240 includes original model 210 encapsulated by a unified frame 248. The encapsulation coverts a standardized input 242 to input 212 that model 214 requires and converts output 216 that model 214 produces to a standardized output 246. Specifically, the main function of module adaptor 230 is to use a unified format, e.g., JSON and XML, to define the properties of various ML models so that the models can interconnect and interoperate. The properties and requirements are from the objects to be analyzed, e.g., inputs/outputs, and the detailed are further illustrated in model descriptor 220.

Model descriptor 220 defines a unified or uniform format for properties of adapted model 240. Model descriptor 220 may, for example, classify and be dependent on the functions of models 210 and 240. Some examples of model functions include facial recognition, moving object tracking, and speech-to-text translation, and based on the characteristics of original model 210, model descriptor 200 provides one or more function codes identifying one or more functions or adapted model 240. Model descriptor 220 may further indicate characteristics of model execution such as the characteristics of the hardware platform. Other properties of adapted model 240 that model descriptor 220 characterizes may be based on the different AI platforms for original model 210. These platform-dependent properties may indicate a framework, e.g., Tensorflow, Caffe and OpenVino. Model descriptor 220 may further indicate hardware requirements such as CPU, GPU, VPU and FPGA requirements for execution of adapted model 240. For cloud-based machine learning services, model descriptor 220 may identify a cloud service provider for original model 210 and the credentials needed for access to the cloud service provider. For example, such properties may include a URL of the RESTful website of the services or models, mapping rules between web service parameters and input/output properties, and the standardized input properties and parameters.

Model descriptor 220 may further indicate properties that are specific to particular functions of adapted model 240. For instance, for the video and image analytics, the input objects are usually video frames and images, and the corresponding input properties and parameters include: image resized height, e.g., 512; image resized width, e.g., 1024; image channel number, e.g., 3; image channel order, e.g., BGR (Blue, Green, Red); batch size, e.g., 1; prediction confidence filtering, e.g., 72%; input pre-processing procedure, e.g., input unwrapping (from unified properties to model specific properties), resizing and conversion; and output properties.

Properties that model descriptor 220 defines for an object detection model may include: bounding boxes in an array of coordinates (x0, y0, y1, y1) converted to original image size, e.g., [(134, 468, 234, 668)]; predicted class index, e.g., 6 from the index array [0, . . . , 80]; predicted class name, e.g., from a student class name array; prediction confidence, e.g., 72%; and an output post-processing procedure, e.g., output wrapping (from model specific properties to unified properties).

The above examples of properties indicated by model descriptor 220 are just examples and are not intended to be exhaustive. In general, model adaptor 230 uses the information from model descriptor 220 for encapsulation of the heterogeneous original models 210 to create adapted models 240 meeting the interoperability requirements.

Model Adaptor

Figure 3:
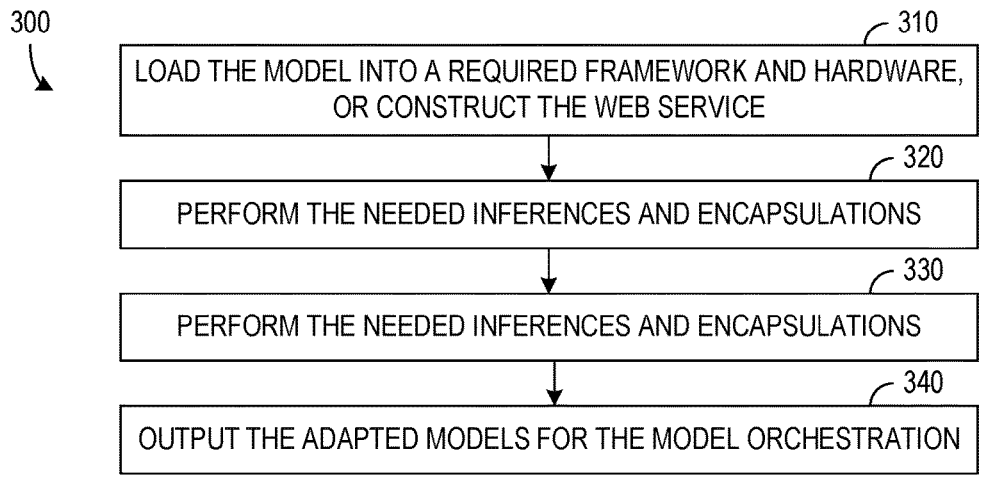
FIG. 3 is a flow diagram of a model adaptation process in accordance with an example of the present disclosure.

Model adaptor 230 processes original model 210 based on the model descriptor 220 for original model 210 to produce adapted model 240. FIG. 3 illustrates an example process 300 for creating adapted model 240. In an initial process block 310, model adaptor 230 loads original model 210 into a required framework and hardware for execution or constructs the RESTful web service the associated Cloud service providers require. Original model 210 generally may not be interoperable with other parts of the workflow, so model adaptor 230 in a process block 320 performs the needed inferences and encapsulations on the original model 210 to provide adapted model 240. In a process block 330, model adaptor 230 hides the model specific runtime, that is, models may run in parallel and are not aware of each other's status details. A process block 340 outputs adapted models 240 for the control or model orchestration module to use.

Online Adaptation

VSI system 100 may support online model adaption for an operational environment, which may be the operational environment of the VSI or an external AI platform in the Cloud. For the models from the VSI hosting platform, model descriptor 220 provides information regarding machine learning model frameworks and training environment, and model execution hardware platform, e.g., CPU, GPU and VPU. For the models from the Cloud, module adaptor 230 adapts the models to the Cloud environment with the access credentials and the RESTful Web service URL for Machine Learning, as well as the I/O format, attributes, and parameter mappings.

Model Orchestration

The model adaptation process unifies the AI models involved in a workflow and makes possible integration of the AI models together for an analysis. Model orchestration module 120 of FIG. 1 can fulfill the integration by performing a model orchestration process that interconnects and orchestrates the adapted models in specific computing and logic time sequences in a workflow. VSI system 100 also ensures conformance to the computing and logic modules for the specified integration of the adapted models 146 and 148 deployed in analytics engine 140.

Computing and Logic Modules

Various AI models 148 may be trained for specific data/tasks and application environment and adapted by model adaptor 150 for the vertical solution integration. For user AI applications, additional computations and logic properties are generally required and are provided by instances 146 of computing and logic modules 166 and 168. For instance, if an AI analytics task only requires individual recognition, a facial recognition model, i.e., an AI model 162, that is trained and adapted suffices. For a task of passenger statistics at train stations, a user may require an estimate of the number of passengers at each platform, entering and exiting each platform, as well as the number passengers in a station. In addition to an object recognition and tracing model, a solution needs a computing module of cross-line-checking, that is, a count of passengers who cross (enter/exit) a station and platforms entrance or exit. The count is based on the results of an object recognition and tracking model. On the other hand, passenger movement follows a temporal logic sequence, e.g., a passenger enters the station, walks to a platform, waits for the train and boards the train. Consequently, the AI analytics need to follow a temporal logic sequence that a logic module 168 imposes on the workflow.

Computing and logic modules 166 and 168 can be specified by the users or provided by the AI platforms, domain experts, and other external sources, e.g., Open Source. The VSI may provide an Application Protocol Interfaces (API) for interfacing and downloading these needed models 166 or 168.

Workflow

A workflow defines how adapted AI models and computing/logic modules are to be integrated together to form a vertical solution. For example, when a user wants to construct a vertical solution for monitoring train station passenger flow statistics, model orchestration module 120 (based on user input) selects the needed AI and ML models 162 and 164, including particularly object recognition/tracking and computing and logic models 166 and 168 such as cross-line counting models. The selected models are defined and adapted for the required properties and formatted in JSON, for instance, and may be trained with stored video stream data from train stations.

A model orchestration process such as process 400 can be used to construct the workflow. Process 400 may begin with a process block 410 in which the required AI and ML models are selected. The selection may be based on a user selecting solution components and requirements, e.g., Facial Recognition and Object Tracking using a user interface. FIG. 5, for example, illustrates a screenshot 500 of a user interface that provides a user with a library or folder 510 containing a list of available AI and ML models, and for the train passenger example, the user may select and drag an icon 512 representing people detection and an icon representing object tracking into a workflow area 502. Each of the icons 512 and 514 may provide a menu for selecting options or a link to an information screen for setting parameters of the model that the icon 512 or 513 represents. For instance, if a Facial Recognition Model is required to be run on a CPU platform, selection process 410 of FIG. 4 may include model orchestration module 120 selecting a model that is supported on the CPU platform. If VSI system 100 has already constructed and stored as a Workflow, the stored workflow including the previously selected models can be retrieved from storage and selected for the current usage (with appropriate modifications). Whenever a model is needed, the model can be trained with the specific application data and environment for the analytics task once the application data and environment are known.

A process block 420 selects any computing and logic module the user requires for the workflow of the user task. The train passenger tracking process, for example, needs a computation of the analytics task, e.g., cross-line counting. The user interface of FIG. 5, for example, may provide logical library or folder 520 containing computing and logic modules that the user may select, and the illustrated example shows workflow area 502 containing a cross-line count icon 522 representing a computing and logic module selected for the workflow.

Figure 4:
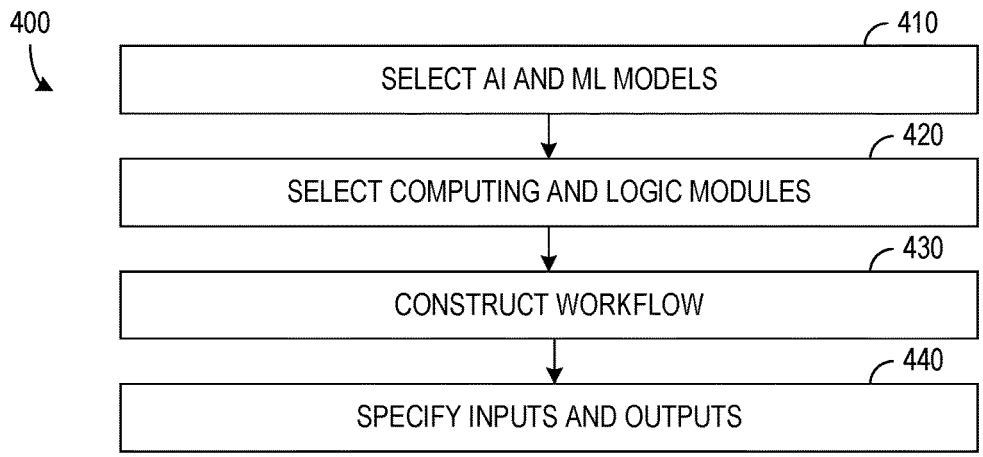
FIG. 4 is a flow diagram of a model orchestration procedure in accordance with an example of the present disclosure.
Figure 5:
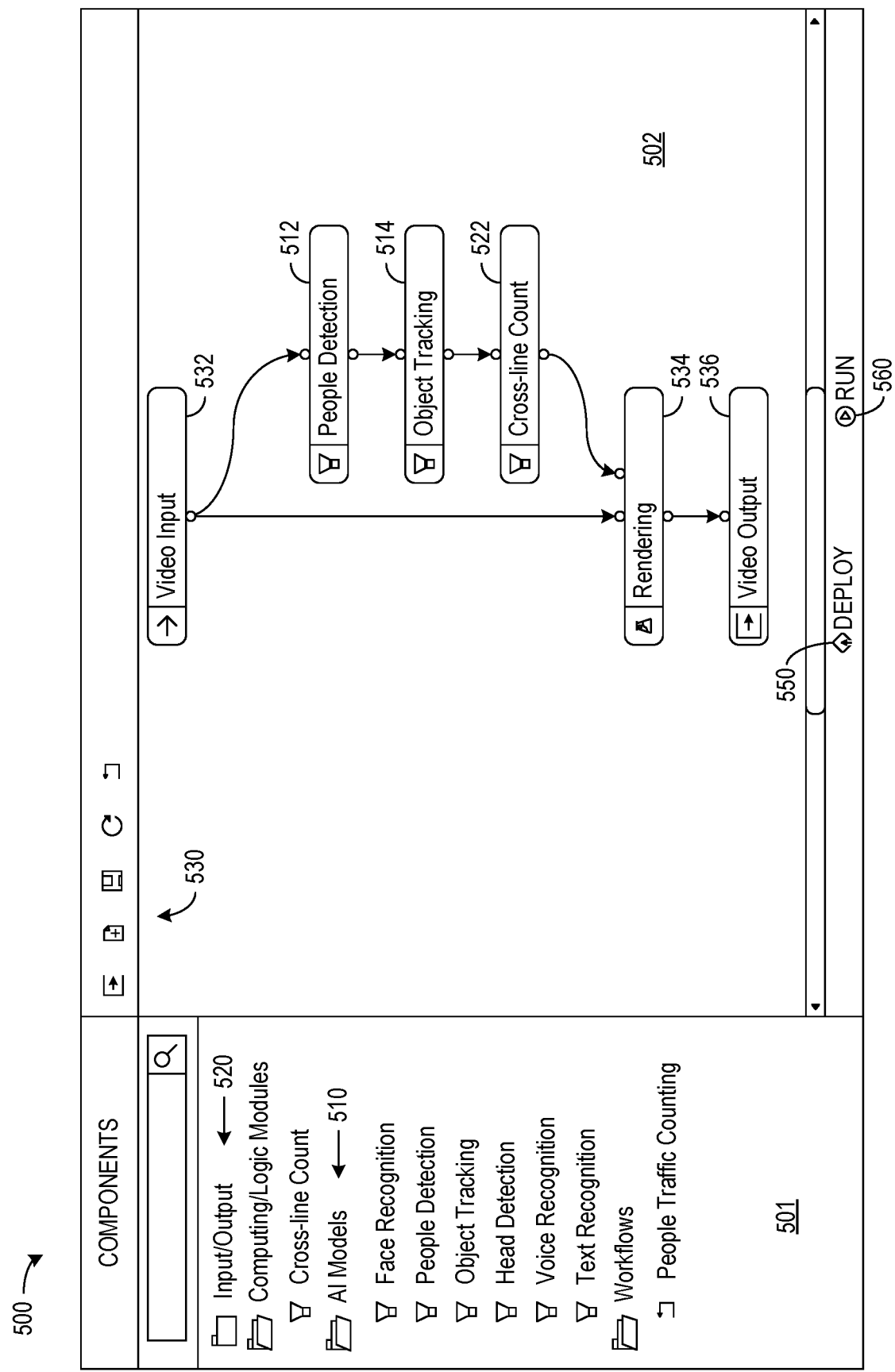
FIG. 5 illustrates a graphical user interface used during creation of a workflow in accordance with an example of the present disclosure.

A process block 430 in process 400 of FIG. 4 constructs the workflow using the selected modules. This construction may include ordering the selected models and indicating routing of output from each model to one or more next module in the workflow. FIG. 5 illustrates a constructed workflow in the form of a Directed Acyclic Graph (DAG) by arranging the models selected in process blocks 410 and 420 and representing interconnections of the models with arrows. Process block 430 flow to or from the involved models, and a model adaptation procedure such as described above may be needed to enable interoperation.

A process block 440 specifies the inputs and the outputs for the workflow. In the example of FIG. 5, a user may use an option from a menu 530 to select video data as input and may define the source and other characteristics of the video data, e.g., a URL of an Internet connected camera at the train station where passengers are tracked. The user may similarly use menu options to indicate what output information the user desires and indicate a format for the output information. In the example of FIG. 5, the user selected for the output video data to undergo rendering (icon 534) for output as video output (icon 536) to a user identified destination. Process block 440 specifies I/O to or from the involved models, and a model adaptation procedure (such as described above) may be needed to implement user requirements.

A user may "deploy" a workflow, once completed, using a deploy button 550 in the example interface of FIG. 5. In response to selection of deploy button 550, model orchestration module 120 in VSI system 100 of FIG. 1 may direct control module 130 to prepare instances of adapted models in analytics engine 140. A run button 560 may then begin operation of the deployed workflow, and the user may monitor and record the executions of the workflow via a graphical user interface 110.

The workflow created through model adaptation and model orchestration processes, e.g., processes 300 and 400 of FIGS. 3 and 4, may be stored as a vertical solution with semantics for the executions, future usage, or modification. Vertical solutions may particularly be stored in data store 180 of the VSI platform of FIG. 1 or in a separate storage and may be made available to a user having requirements that are the same or similar to the requirements the vertical solution was created to meet.

A vertical solution may be stored using JSON (JavaScript Object Notation), which is an open standard file and data interchange format in human-readable text. A file in JSON format can contain data objects consisting of attribute—value pairs and array data types or any other serializable values. The stored JSON file can be directly executed on a workflow execution platform by the analytics engine or be automatically converted to Python, C # or other programming languages to be executed or stored for future usage. From model selection to the completion of vertical solution construction, there is no manual coding involved.

Built-in Annotation Tool for AI Model Training

Model training is an important part of AI analysis that determines the efficiency and accuracy of the analytics results. The VSI system may include annotation tools for efficient AI model training. For most AI applications, the AI model is to be pre-trained with the application data and in the implementation environment to improve the accuracy and performance. The VSI system 100 contains an annotation tool 135 for the AI model training, so that users can annotate the application data, e.g., original video and audio streams, images and texts. Such data may be obtained from the data store or directly from the application hardware devices, e.g., video camera. Based on the annotations, users can further train the ML models to improve the efficiency and accuracy of the analytics, that is, after training, the involved deep learning and deep neural network models are optimized for the specific analytics tasks of the constructed vertical solution, and the optimized parameters may be stored together with the application vertical solution.

The VSI may also provide interfaces with the Cloud and other AI Platforms for the model training so that the selected external AI and ML models can be pre-trained before being integrated into a vertical solution under construction. These interfaces may be managed by the control module and associated with the model and orchestration processes so that the models can be integrated as part of the workflow. This VSI capability of obtaining external AI models extends the functions of the constructed vertical solution and facilitates the partnership and collaborations with other AI Platforms and service providers.

Inputs and Outputs

A data analyst in orchestration procedure described above, e.g., process block 440 of FIG. 4, connects a workflow with all the needed data sources, including the data streams in data store or from hardware in real time, e.g., IP cameras and audio recorders. The analyst can impose specific restrictions, e.g., the time duration, regions of interest and camera resolution. On the other hand, the analyst can also specify the output types, media and other requirements. In accordance with a further aspect of the present disclosure, the VSI may also support external or remote I/O via, for instance, RESTful API, so that the constructed vertical solution can support event-based notification, e.g., when a pedestrian crosses a certain line a warning signal is triggered, and policy-based alert, e.g., when the number of passengers on a school bus exceeds a threshold value an alert message is issued to the bus driver or school administrator.

VSI Provisions

When an analytics engine, e.g., analytics engine 140 of FIG. 1, processes the assigned analytics of a vertical solution by executing various AI models in the workflow for analyzing objects, e.g., video and audio streams, the involved AI models are trained and adapted along with the ML, Computing and Logic Modules. Via the control unit, e.g., control module 130 of FIG. 1, the analytics engine can store and retrieve the preprocessed models at the Edge on a local hardware disk or in a Cloud. Consequently, the analytics engine can provide the analysis at the Edge, in the Cloud, or at mixture of Edge and Cloud. Naturally, the VSI can be also provisioned at the Edge, in the Cloud, their mixture, or even at terminals, such as mobile devices. The flexibility of the VSI and vertical solution provision and execution greatly facilitates their applicability and extendibility for a variety of application environments and needs.

Figure 6:
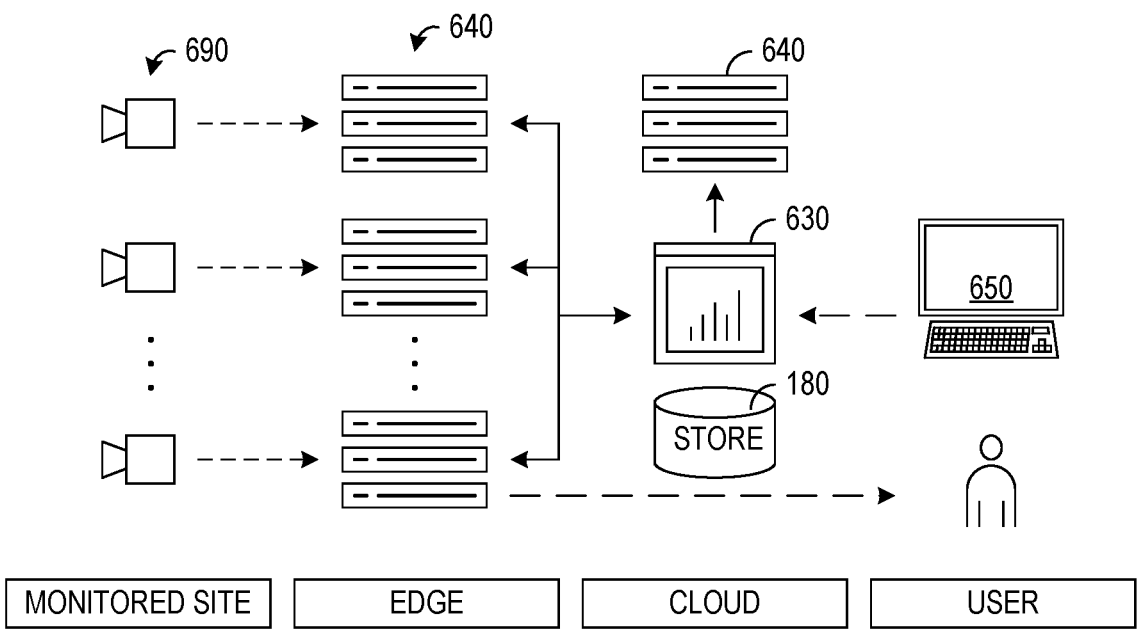
FIG. 6 is a block diagram illustrating hardware in a vertical solution integrator system in accordance with an example of the present disclosure.

FIG. 6 schematically illustrates a VSI provision from Edge to Cloud in accordance with an example of the present disclosure. In this example, the objects for AI analytics are video streams from one or more video cameras 690 at a monitored site. Analytic engines 140 are in servers 640 deployed from Edge to Cloud, and a control module 130 in a server 630 is in the cloud. For a time-sensitive vertical solution, control module server 630 and analytics engine servers 640 may be deployed at the Edge for fast responses, however, for complex and time/space consuming tasks without real-time constraints, analytics engine servers 640 can be implemented in servers anywhere in the Cloud to reduce the capital expenses of the Edge. For workflow execution, the analytics results from one model executed in one server 640 may be the inputs to the succeeding models executed in other servers 640 or may be the final output results from the vertical solution. When models are executed or communicate with each other in the Cloud, the VSI may adapt the I/O formats from/to the Cloud, following the involved Cloud service protocols.

Graphical User Interface

A graphical user interface such as user interface 110 described above may be implemented through a browser or a custom application on a computer system 640 operated by the user as shown in FIG. 6. The user interface enables a data analyst or other user to interact, monitor, and manage the VSI, control module 130 on server 630, data store 180, and analytics engines 140 on servers 620, as well as the vertical solution executions.

Returning to FIG. 5, user interface 500 contains two display areas 501 and 502. Area 501 contains the selected and collected AI and ML Models for training, Computing and Logic Modules, and analytics objects along with their I/O, e.g., video and audio data streams and output data from the analytics engine. Area 501 can also include one or more previously constructed workflows for reuse or revision. When a user enters the requirements for a vertical solution, the model orchestration process selects from area 501 one or more adapted AI/ML models 510 and computing/logic modules 502 and displays icons represent the models in workflow area 502. A user may simply drag the models from area 501 to area 502. The user may then specify the inter-relations of the models in area 502 to form a workflow. The user interface in some implementation may be implemented by porting from the available GUI workflow editing tools, e.g., Activiti, Flowable, and Microsoft Visio.

After the VSI, e.g., model orchestration module 120 of FIG. 1, integrates a workflow from user requirements via a GUI, the control unit, e.g., control module 130, creates analytics tasks and assigns the analytic tasks together with the objects to analytics engines, e.g., analytic engine 140, for execution. Analytics tasks can be assigned to analytics engines in various ways, including static, round-robin or status dependent assignment based on the servers executing the analytics engines. A static assignment associates each task with a predetermined analytics engine, but a round-robin assignment generally does not use the static associations. For efficiency, VSI task assignment may be based on the status of the analytics engine status, e.g., whether the analytics engine is idle or in normal operation. A preferred choice may be an idle analytics engine that has been operating normally, which may be determined by CPU, memory and hard disk utilization statistics.

Users can monitor and manage operations of the control unit, e.g., control module 130, and analytics engines, e.g., analytics engine 140, via the graphical user interface, e.g., user interface 110, to: monitor status, e.g., idle or busy, of the analytics engines; monitor operation, e.g., normal or abnormal, of the analytics engine execution; abort or terminate tasks; and delete tasks or vertical solutions in storage, e.g., data store 180.

Control Module

Control module 130 in some examples of VSI system 100 may provide user management functions. For example, to allow a system administrator or data analyst to register, remove, edit, and authenticate user accounts and credentials. With this function, only users that control module 130 validates as having provided valid authentication and credentials may be permitted to access VSI system 100 or specific functions such as data output from a vertical solution.

Control module 130 may further provide data source and device management. Data source and device management may allow a system administrator or a data analyst to register and provision hardware devices and data sources such as devices 190, manage the connectivity of the hardware devices, and update the operation status of hardware devices. Access to such management functions limited to authorized users for which control module 130 validated. A system administrator can also manage the data source and import/export application data from/to external storages and Cloud.

Control module 130 may further be used for license management in accordance with a license agreement providing terms for the access and execution by the user vertical solution.

Control module 130 may provide system setting management, which allows users to update their profiles, supports system administrators to modify the data sources and device reservoirs, and assists data analysts to conduct system health checking.

Analytics Engines

The advancement of AI technologies has revolutionized the analytics of video, audio, images and texts. In early days, video and audio streams were recorded and analyzed manually by human through a replay. Various AI techniques, such as machine learning and deep neural network enable automated, accurate and online analytics by computers, e.g., Facial Recognition, Object Recognition and Tracking, and Speech-to-Text Translation. Such AI analytics are conducted by AI analytics engine.

Figure 7:
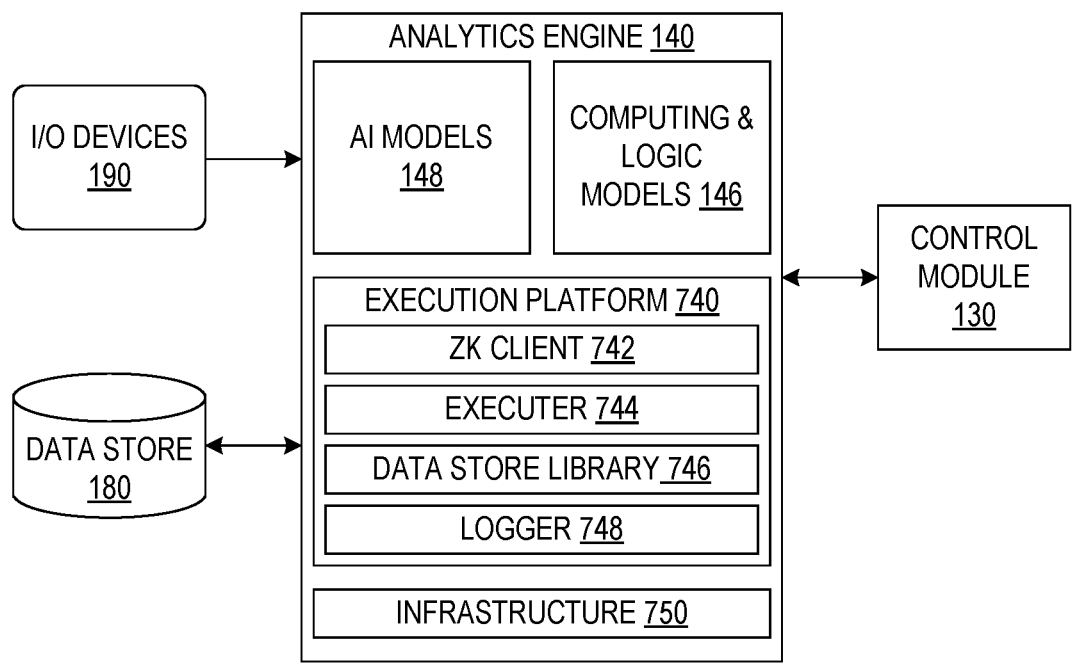
FIG. 7 is a block diagram illustrating an analytics engine in accordance with an example of the present disclosure.

FIG. 7 is a block diagram showing greater detail of one example of an analytic engine 140, which may be used in the VSI system of FIG. 1. Analytic engine 140 may be deployed at the Edge, e.g., on local servers of the user, or in the Cloud to facilitate the Edge to Cloud operations. Analytics engine 140 may host various AI or ML models 148 and computing/logic modules 146 to run on an execution platform 740 that is supported by an execution infrastructure. FIG. 7 shows an example of execution platform 740 that includes four components: a Zookeeper (ZK) client 742, an executor 744, data store libraries 746, and logger 748. ZK Client 742 interacts with analytics engine infrastructure 750 and watches and fetches analytics tasks for the executions by analytics engines. After the execution, the analytics results are stored in data store 180 via API, and logger 748 records important events for debugging and troubleshooting. The execution platform 740 may be supported by a software stack that contains device drivers, multimedia related tools and acceleration libraries, e.g., Caffe, Tensorflow, NVIDIA CUDA, OpenCV, FFMpeg and video-streaming servers. Control module 130 assigns analytics tasks to analytics engine 140 with specific requirements, objects to be analyzed, and relevant data inputs. Analytics engine 140 may store and retrieve data and results to or from data store 180. More specifically, for the operations of a vertical solution in the form of a workflow, for an AI or computing model execution, control module 130 assigns a task to analytics engine 140 along with the objects and data for an analysis. The results are stored and/or returned to the workflow in execution for the succeeding computations.

Flexible mechanisms may be employed for the data provision to analytics engine 140. For example, control module 130 can instruct and authorize analytics engine 140 to obtain/connect to objects and user data from data store 180 or can instruct I/O devices 190, e.g., video camera or other data sources, to send data to analytics engine 140, or control module 130 can retrieve data from data source 190 or data store 180 and then send the data to analytics engine 140.

Data Store

Figure 8:
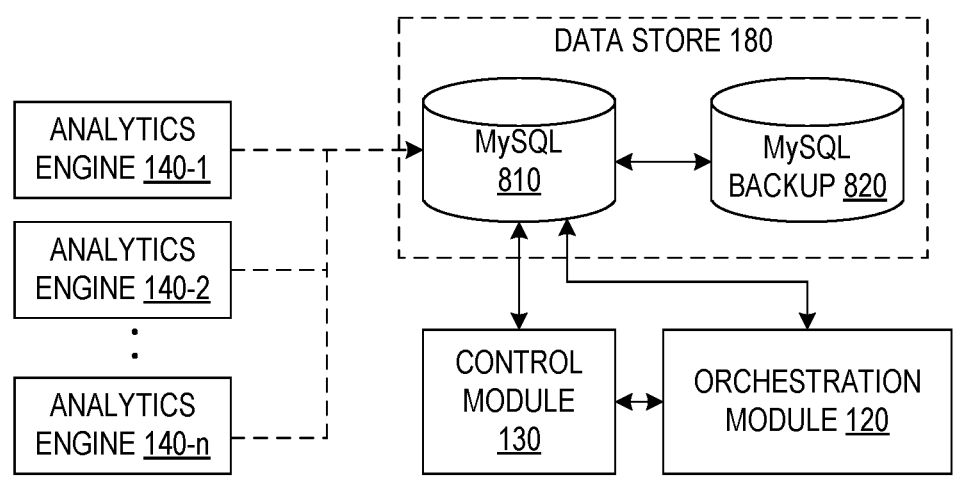
FIG. 8 is a block diagram illustrating interactions of a data store with analytics engines, a control module, and an orchestration module in accordance with another example of the present disclosure.

Data Store 180, which stores the data of AI platform and the VSI, may be hosted, as shown in FIG. 8, on a MySQL server 810 with a backup 320 and with Python APIs and libraries. Data store 180 interacts with orchestration module 120, control module 130, and analytics engines 140-1 to 140-*n* to provide information for the management and execution of tasks, as well as to store and retrieve the inputs, output and intermediate analytics results from execution of a vertical solution. Data store 180 may allow an authorized user or an authenticated third-party to directly access or modify the data in data store 180.

Automated Formal Analysis of Vertical Solutions

A constructed vertical solution may contain or encounter many kinds of design, specification, implementation, and runtime errors, such as interface mismatch, unspecified receptions, deadlocks, live-locks, incorrect execution sequences, and interoperability. For correctness, robustness and performance of the constructed vertical solution, a VSI may perform a rigorous analysis process of vertical solutions with automated verification, validation, and testing procedures using formal methods. Formal analysis may be performed during construction of a workflow that is a Directed Acyclic Graph (DAG) or after the storage and/or delivery and execution of the workflow DAG.

Formal methods are mathematically rigorous procedures for the system analysis and testing for correct functioning, robustness, and performance of the system. Formal methods may be applied, for example, in different areas of hardware and software systems, including routers, Ethernet switches, routing protocols, security applications, and operating system microkernels. NASA and most well-known hardware vendors, including IBM, Intel and AMD, use formal methods for their mission critical projects. Formal Methods include formal specification, verification, validation and testing. A VSI system in accordance with an example of the present disclosure may employ formal methods including but not limited to vertical solution formal specification, vertical solution verification or model checking, vertical solution validation, vertical solution testing that includes the conformance testing, interoperability testing, and stress testing.

Vertical Solution Formal Specification

For a formal analysis, a given vertical solution needs to be in a mathematically rigorous and machine executable format with unambiguously defined system syntax and semantics complying with a formal specification. The formal specification can be a graph or in a formal language, such as Specification and Description Language (SDL) and Java Modeling Language (JML). A major hurdle of formal methods in many complex system implementations is the difficulty of obtaining a formal specification. Determining a formal specification is often as hard and error prone as a system implementation itself. Vertical solutions constructed by the VSI do not have the problems of obtaining a formal specification for an analysis. Specifically, the VSI constructs a vertical solution in a workflow that is a Directed Acyclic Graph (DAG) where the nodes are the adapted model blocks and edges are their interfaces and data flow; the workflow DAG is a formal specification already. Mathematically, it is an Extended Finite State Machine (EFSM) that is a Finite State Machine (FSM) extended with variables and parameters, which represent the data portion of the vertical solution. A general EFSM model is Turing Complete, that is, it has the same computing power as the Universal Turing Machine.

After a workflow DAG is constructed, the VSI stores workflow DAG in the data store and automatically generates a formal description in JSON and then code in Python. The formal analysis of a constructed vertical solution is conducted on the workflow DAG that is an EFSM with the generated vertical solution Python system code. The VSI contains a vertical solution Emulator that executes the vertical solution Python code for its runtime behaviors.

Vertical Solution Verification and Model Checking

Formal verification proves properties of a formal specification. Various verification tools, such as Runtime Assertion Checker and the Extended Static Checker (ESC/Java) have been developed and can be conducted by manual proof or automated proof, including Theorem Proving, Abstract Interpretation and Model Checking that focuses on certain properties of interest. For a vertical solution workflow DAG, one can do a manual proof of correctness and desired properties, using assertion proof. Specifically, for the I/O of each node, one can assert certain conditions and properties, and prove their invariance before and after the node execution; the proof is performed for all the nodes in a vertical solution DAG from the source nodes to the sink nodes, according to the direction of the execution workflow. For instance, to prove that a vertical solution has the property that a moving object has been tracked, an assertion may be placed before and after each computing model node. Each node operation can then be examined to show that the node keeps track of the object before and after its execution.

Manual proof applies generally only to a small number of computing models in a vertical solution. For a large number of nodes, particularly, when their interrelations form a complex DAG, automated Model Checking can be employed. The VSI may contain a built-in model checker that runs the vertical solution emulator, executes the vertical solution Python code and automatically checks whether properties of interest are satisfied during the whole execution process.

Vertical Solution Validation

Instead of verifying specific properties, one may want to identify all the possible system state errors in a constructed vertical solution. Automated validation explores the system states and identifies the faulty ones. Given the large, possibly infinite, number of system states for many application systems, running into the well-known state-explosion problem may be very likely and appropriate state pruning may be conducted to have the number of explored states under control.

The VSI implements a validation procedure in the following steps. The VSI first specifies the faulty states that one wants to find, as well as the state pruning procedure. The VSI then runs the vertical solution Python code, stores the explored system states and examines them for faults. Specifically, the VSI maintains a set of active states for an exploration. For an active state, properties of the active state are examined for possible faults and then the next states are explored by putting the next states in the active state list. When all of its next states are explored the active state is removed from the active state list and is not explored again. The orders of the next state to explore determine the nature of the exploration/search, e.g., a Depth-First search or Breadth-First Search. The process continues until a fault is found or all the system states are exhausted.

Vertical Solution Testing

Testing is an important part of system engineering and vertical solution is of no exception. Vertical solution testing may include: Conformance Testing to check whether a system implementation conforms to its specification; Interoperability Testing to test whether various system components can interoperate; and Deliverable Testing including stress testing.

Conformance Testing

Conformance testing checks whether a vertical solution implementation, that is, a Python program, conforms to its specification, that is, a Workflow DAG or an EFSM. An online minimization procedures may be performed as follows. Take a vertical solution specification of a Workflow of an Extended Finite State Machine (EFSM). Compute an equivalent Finite State Machine (FSM) using an online minimization procedure that contains only the system states that are reachable from the initial state, e.g., from the source node with the initial variable and parameter values. Furthermore, the FSM is minimized in the sense that all the equivalent system states are merged. For the constructed FSM, construct a minimal set of covering paths that cover all the states and edges of the FSM and that are from the source nodes to the sink nodes. Each path forms a test sequence. For the test execution, invoke the VSI emulator to run the vertical solution Python code for executing the test sequences. The resulting I/O sequences from the execution are compared with that from the specification EFSM, and a discrepancy reveals an implementation fault.

Interoperability Testing

Interoperability testing checks whether the nodes of the computing models in a vertical solution workflow DAG interoperate with each other. A procedure for the test sequence generation is developed and integrated into VSI that is based on the covering paths as in the conformance testing. However, the main difference is that interoperability testing focuses on the interfaces among the computing models, that is, the inputs/outputs compatibility among the models during their execution, whereas the conformance testing checks the I/O behaviors from the test execution.

Deliverable Testing—Stress Testing

There are a variety of deliverable tests for the system development. Given the large data volume of typical AI applications, the VSI focuses on stress testing that tests how much data/work load a vertical solution application platform can sustain and when and how performance degrades. Given a constructed vertical solution, a system tester collects large volume of valid input data, e.g., from the data store or available I/O devices and runs the vertical solution emulator while inputting an excessive amount of data in a short period of time. The crash or degradation of vertical solution performance reveals faults or weakness in terms of the performance.

Mobile VSI

Given the current limitations of the mobile device computing power and memory size, it is infeasible to have the whole AI platform, e.g., the VSI including analytics engine, control module and a data store on a mobile device, such as an iPhone. However, one can install a VSI App on an iPhone with the GUI for user interface and control and deploy the remaining system components and data in Cloud. A mobile implementation of user interface 110 conveniently allows a user to construct a vertical solution from a phone and have the execution in Cloud with the output directly displayed on the phone. However, certain delays may occur due to the remote Cloud service provision.

ADVANTAGES

The VSI technology disclosed herein establishes a no-code AI application system development platform that bridges the gap between the AI platform functions and user application vertical solutions system building.

Prevalent AI platforms currently offer a variety of AI functions. But, for application vertical solution systems, often more than one AI functions are needed and must interconnect and interface in specific orders. Furthermore, other computing models may need to be involved and joint operations generally need to obey certain logical and temporal rules. Consequently, for applications, users need to build a vertical solution system that integrates various AI models, computing modules, other hardware and software systems, inputs/outputs devices, and data sources together for an application. For such system building, users often resort to system integrators with a team of AI experts and software engineers for the design and development of an application system. This development is costly and time consuming with uncertain quality and performance.

Vertical Solution Integrator as disclosed herein is a technology that enable users to build an application vertical solution system on an AI platform without any coding efforts. This innovation establishes a no-code AI system development platform and significantly reduces the cost, shortens the design to delivery cycles, and improves the system reliability and performance. There have been limited efforts along this direction. It was proposed that one may connect the relevant models in a chain or pipeline to implement an AI analytics function. Then one can build an application system by integrating such relevant functions together. The modeling power of such approaches are rather limited and manual programming for a whole application vertical solution system is often still needed. Furthermore, there are no formal analysis procedures involved with these approaches.

Each of modules disclosed herein may include, for example, hardware devices including electronic circuitry for implementing the functionality described herein. In addition or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. An Artificial Intelligence (AI) vertical solution integration system including a computer system with a processor configured for constructing an AI application vertical solution without manual programming, the system comprising:
   a model adaptation system implemented in the computer system and configured to adapt a set of models including one or more AI models to produce adapted models that employ a uniform format to be compatible with each other and with objects and data that are to be analyzed;
   a model orchestration system implemented in the computer system and configured to receive user requirements from a user and to interconnect one or more of the objects and one or more of the adapted models to form, based on the user requirements, a workflow for the AI application vertical solution system;
   one or more analytics engines implemented in the computer system and configured to execute analytics tasks corresponding to the adapted models; and
   a control unit implemented in the computer system and configured to create from the workflow, a set of analytics tasks that analyze the objects identified in the workflow using processes corresponding to the adapted models interconnected in the workflow, the control unit being further configured to assign the analytic tasks to the one or more analytics engines for execution, wherein
   the model adaption system is configured to adapt a variety of application protocol interfaces for the AI models to create adapted models that include interoperability and collaboration with other AI platforms deployed at various locations from the edge to the cloud, and
   the model adaptation system is further configured for automated code generation that generates, without any manual programming, executable code for execution of the AI application vertical solution.

2. The system of claim 1, wherein the set of models include the AI analytics of the objects with machine learning and deep neural network models.

3. The system of claim 1, wherein the objects provide one or more of a video data stream, an audio data stream, image data, speech data, and text data.

4. The system of claim 1, wherein the control unit assigns the analytics tasks to the analytics engines using optimization criteria based on respective function and operation statuses of servers on which the analytics engines are executing.

5. The system of claim 1, wherein the control unit manages input data and output data of the analytics tasks including adapting formats of the input data and the output data of the analytics tasks.

6. The system of claim 1, further comprising a graphical user interface that enables the user to define and specify functions and operations of the models in the workflow, to monitor execution statuses of the analytics tasks, to receive results, and to store the results in a data store.

7. The system of claim 1, further comprising a graphical user interface for the user to manage, monitor, and abort execution of the analytics tasks or delete any of the analytics tasks.

8. The system of claim 1, further comprising a graphical user interface configured to enable the user to enter the user requirements and manage operation of the model adaptation system and the model orchestration system for creating the workflow, the graphical user interface displaying a graphical representation of the workflow for review, editing, storage and execution.

9. The system of claim 1, further comprising a graphical user interface implemented on a mobile device capable communicating with the model orchestration system, analytics engines and control unit for the construction and execution of the AI application vertical solution.

10. The system of claim 1, wherein the computer system comprises:
    one or more edge servers executing one or more of the analytics engines; and
    one or more servers in the cloud executing one or more the analytics engines, wherein
    the control unit can assign the analytics task to provide the AI application at the edge, in the cloud, or in a heterogeneous execution infrastructure with both edge and cloud.

11. The system of claim 1, wherein the model adaptation system provides an annotation tool to record training parameters of machine learning and deep neural network models for the optimization of accuracy and performance.

12. The system of claim 1, further comprising an automated formal analysis unit implemented in the computer system and configured to analyze the constructed AI vertical solution application for correctness, reliability, and performance.

* * * * *